(12) United States Patent
Bruekers et al.

(10) Patent No.: US 8,831,954 B2
(45) Date of Patent: Sep. 9, 2014

(54) LOCALIZING THE POSITION OF A SOURCE OF A VOICE SIGNAL

(75) Inventors: Alphons Antonius Maria Lambertus Bruekers, Eindhoven (NL); Bahaa Eddine Sarroukh, Eindhoven (NL); Thomas Andreas Maria Kevenaar, Sterksel (NL)

(73) Assignee: Nuance Communications, Inc., Burlington, MA (US)

( * ) Notice: Subject to any disclaimer, the term of this patent is extended or adjusted under 35 U.S.C. 154(b) by 864 days.

(21) Appl. No.: 12/990,792

(22) PCT Filed: May 5, 2009

(86) PCT No.: PCT/IB2009/051829
§ 371 (c)(1),
(2), (4) Date: Nov. 3, 2010

(87) PCT Pub. No.: WO2009/136356
PCT Pub. Date: Nov. 12, 2009

(65) Prior Publication Data
US 2011/0054909 A1    Mar. 3, 2011

(30) Foreign Application Priority Data

May 8, 2008  (EP) ..................................... 08155872

(51) Int. Cl.
| | | |
|---|---|---|
| G10L 21/00 | (2013.01) | |
| G10L 25/00 | (2013.01) | |
| H04R 3/00 | (2006.01) | |
| G06K 9/00 | (2006.01) | |
| G06K 9/46 | (2006.01) | |
| G06K 9/32 | (2006.01) | |
| G10L 15/20 | (2006.01) | |

(52) U.S. Cl.
CPC .................................. G06K 9/3216 (2013.01); G10L 15/20 (2013.01)
USPC .............. 704/275; 381/92; 381/122; 382/100; 382/118; 382/111; 382/181; 382/191

(58) Field of Classification Search
CPC ..... G10L 21/00; G10L 21/02; G10L 21/0202; G10L 21/0205; G10L 21/0272; G10L 21/28; G10L 25/48; G10L 25/57; G10L 99/00; G10L 2021/02; G10L 2021/02166; G06F 3/011; G06F 3/01; G06F 3/012; G06F 3/013; G06T 1/00; G06T 1/0014; G06T 1/0007; G06T 1/0028; G06K 9/00221; G06K 9/00228; G06K 9/00234; G06K 9/00241; G06K 9/00248; G06K 9/00335; G06K 9/00362
USPC ............................................................ 704/275
See application file for complete search history.

(56) References Cited

U.S. PATENT DOCUMENTS 6,593,956 B1 * 7/2003 Potts et al. .................. 348/14.09
6,686,844 B2 * 2/2004 Watanabe et al. .......... 340/573.1

(Continued)

FOREIGN PATENT DOCUMENTS

CN         1659505 A      8/2005
CN       101093541 A     12/2007

(Continued)

OTHER PUBLICATIONS

Casanovas et al: "Blind Audiovisual Source Separation Using Sparse Representations"; IEEE International Conference on Image Processing, 2007, ICIP 2007, vol. 3, pp. 301-304.

(Continued)

*Primary Examiner* — Paras D Shah
(74) *Attorney, Agent, or Firm* — Wolf, Greenfield & Sacks, P.C.

(57) ABSTRACT

The invention relates to localizing the position of a person speaking by using pictures of a pattern (21) on an object (20) worn by the person. The object (20) carries a complex pattern (21) that is optimized for determining the orientation of the object (20), the distance from the object to a microphone device (14) and/or to a camera (11). Moreover, the pattern (21) may be arranged for identifying the person carrying the object (20). The determination of the position of the person carrying the object (20) may be used to enhance speech recognition (SR) and/or to provide hands-free voice control of devices (DC), e.g. in hospitals or in industrial settings.

17 Claims, 2 Drawing Sheets

(56) References Cited

U.S. PATENT DOCUMENTS

| | | | |
|---|---|---|---|
| 6,975,991 B2 * | 12/2005 | Basson et al. | 704/271 |
| 7,171,025 B2 * | 1/2007 | Rui et al. | 382/103 |
| 8,237,770 B2 * | 8/2012 | Kenoyer et al. | 348/14.08 |
| 8,688,458 B2 * | 4/2014 | Buck et al. | 704/275 |
| 2003/0068057 A1 | 4/2003 | Miller et al. | |
| 2003/0103647 A1 | 6/2003 | Rui et al. | |
| 2005/0175234 A1 * | 8/2005 | Sakamoto | 382/154 |
| 2006/0104454 A1 | 5/2006 | Guitarte Perez et al. | |
| 2006/0104487 A1 * | 5/2006 | Porter et al. | 382/118 |
| 2006/0133623 A1 * | 6/2006 | Amir et al. | 381/92 |
| 2006/0212996 A1 | 9/2006 | McGrath | |
| 2006/0289009 A1 | 12/2006 | Palomo et al. | |
| 2007/0098303 A1 * | 5/2007 | Gallagher et al. | 382/305 |
| 2007/0247422 A1 * | 10/2007 | Vertegaal et al. | 345/156 |

FOREIGN PATENT DOCUMENTS

| | | | |
|---|---|---|---|
| GB | 2215092 A | 9/1989 | |
| GB | 2440397 A | 1/2008 | |
| WO | 2005102483 A1 | 11/2005 | |

OTHER PUBLICATIONS

Hu et al: "A Self-Calibrated Speaker Tracking System Using Both Audio and Video Data"; Proceedings of the 2002 IEEE International Conference on Control Applications, Sep. 18-20, 2002, Glascow, Scotland, vol. 2, pp. 731-735.

Strobel et al: "Joint Audio-Video Object Localization and Tracking: A Presentation of General Methodology", IEEE Signal Processing Magazine, Jan. 2001, pp. 22-31.

Beal et al: "A Graphical Model for Audiovisual Object Tracking"; IEEE Transactions on Pattern Analysis and Machine Intelligence; Jul. 2003, vol. 25, No. 7, pp. 828-837.

International Search Report and Written Opinion for PCT/IB2009/051829 mailed Jul. 10, 2009.

International Preliminary Report on Patentability for PCT/IB2009/051829 mailed Nov. 18, 2010.

* cited by examiner

LOCALIZING THE POSITION OF A SOURCE OF A VOICE SIGNAL

FIELD OF THE INVENTION

The present invention relates to a system and method for localizing the position of a source of a voice signal. The invention moreover relates to a protective covering arranged for covering a least part of the face of a person, for use in a system or method of the invention. Finally, the invention relates to a computer program enabling a processor to carry out the method of the invention.

BACKGROUND OF THE INVENTION

Hands-free voice control of equipment is useful in many places, like e.g. industrial environments or in the operation rooms of hospitals, for reasons of hygiene, safety or convenience. For adequate performance of voice control or speech control of equipment, speech recognition systems are incorporated. For such speech recognition systems, it is important that the captured voice or speech signals have a very good quality. Other sound and noise sources have a large impact and may render a speech recognition system useless. In order to improve the quality of the speech signals, a variety of signal processing techniques may be used; e.g. filtering, noise suppression and beam forming. In the case of beam forming techniques, the beams can be steered using the captured audio signals or in more advanced systems by using additional video signals. The steering is only possible if the location or position of the controlling user with respect to the system is known. Audio localization techniques provide the location of sound sources. Persons can be identified using computer vision techniques. The two techniques may be combined to define the controlling or desired user. Sometimes feedback from the speech recognizer is used to define who should be controlling the system, for example by saying an activation command.

In US 2006/0104454 A1 a system for selectively picking up a speech signal focuses on a speaker within a group of speakers who wishes to communicate something to the system using an image analysis algorithm to identify, based on a recognition feature, a position of at least one person who wishes to give the system voice commands. The detected position is used to adapt a directional microphone to the at least one person.

In clinical settings the voice control users may be doctors, cardiologists or surgeons. In general they use voice control during diagnosis or intervention. The circumstances are often sterile. The doctors typically wear a mouth cap. In industrial settings the technicians often wear a complete mask. Finding speaking persons in such settings may be a hard task to perform. Audio localization techniques are not sufficient to track or locate sound sources because of the noisy environment, and the many talking persons. Computer vision may also fail in the case where the face or a part thereof is covered.

Therefore an improved system and method for localizing the position of the person controlling equipment by voice would be advantageous. In particular, a more reliable system and method for localizing the position of a person controlling equipment by voice would be advantageous in the case where the face or part thereof is covered.

SUMMARY OF THE INVENTION

The invention preferably seeks to provide an improved system and method for localizing the position of a person, who is controlling equipment by voice. In particular, it may be seen as an object of the present invention to provide a reliable system and a method that solves the above mentioned problems of the prior art with regard to localization of a person having a part of his/her face covered.

This object and several other objects are obtained in a first aspect of the invention by providing a system for localizing the position of a source of a voice signal, comprising an object arranged to be worn by a person having speech organs arranged for being a source of a voice signal, said object comprising a visually detectable pattern, said pattern being placed in a distance from the source of the voice signal; a camera device arranged for recording at least one picture of said pattern or a part thereof; localizing means for determining the position of said pattern on the basis of said at least one picture; at least one microphone arranged for adapting to the position of said source of a voice signal based on the position of said pattern and the distance between said pattern and the source of the voice signal; wherein said localizing means is configured to determine the position of said source of the voice signal based on image processing, where the image processing is performed on said at least one picture of said pattern or part thereof alone. When the image processing is performed on one or more pictures of the pattern or part thereof, the determination of the position of the pattern may be more reliable and/or simpler than using face localization methods or face detection algorithms, since such face localization or detection methods have a relatively high false acceptance rate. Using patterns to position determination will allow for a better and more reliable detection rate than face recognition or face detection algorithms. The pattern should comprise sufficient information to determine the distance between said camera device and said object carrying the pattern.

It should be noted, that any appropriate image processing or image analysis technique may be used for processing the at least one picture of the pattern or part thereof. Moreover, it should be noted that the term "a least one picture" may denote a single picture, a still image as well as a sequence of pictures or a video sequence. Furthermore, it should be stressed that the distance may be any appropriate distance greater than or equal to zero, such that the pattern of the object may arranged at the mouth of a person, such as in front of the mouth, or at a distance from the mouth of the person.

The object may be any object arranged for being worn by a person. It may be a protective covering, such as a mouth cap or face mask, or a complete mask. Alternatively, it may be an object to be placed on the clothes of a person, such as a badge or a sticker. It may also be any other suitable piece of clothing or device to be worn by the person, such as a badge, glasses, earphones, a tie, a working coat, a doctor's white coat, an overall, etc.

According to another aspect, the system further comprises compensation means arranged to compensate for the difference in position between said pattern of said object and the speech organs of said person wearing the object. This is in particular advantageous if the object is arranged to be placed in a distance from the mouth of a person, e.g. if it is a badge to be placed on a jacket or if it is a part of the glasses to be worn by a person. The compensation means may be part of the localizing means.

According to another aspect, the visually detectable pattern is a complex pattern. When the visually detectable pattern is a complex pattern, it may be used to reliably determine the position and/or orientation of the object in relation to the camera device. The term "complex pattern" is meant to denote any pattern more complex than a single straight line.

Thus, a complex pattern may be a curved line, a pattern having a plurality of parts, such as a plurality of dots, a multitude of lines or any combination thereof. A complex pattern may be any pattern suitable for indicating vertical, horizontal and/or rotational orientation, and/or distance from the pattern and/or for embedding information on e.g. person, date, time, etc.

Moreover, the use of a complex pattern on the object renders it possible to embed information within the pattern on e.g. the identity of the user, authorizations to use equipment, preferred settings of equipment, the distance between object and camera device, etc. The complex pattern may be redundant so that the identification thereof is possible also if the at least one picture only comprises a part of the pattern.

According to a yet another aspect, the pattern comprises a barcode and/or different colors. It may additionally or alternatively comprise a logo, letters, numbers or any other kind of complex shape, optionally of a specific size. Hereby, the pattern carries information useful for the detection of the position of the object comprising the pattern.

According to another aspect, the object comprises a display arranged for displaying said visually detectable pattern. Hereby, the pattern on the object may vary in time. Examples of such displays are liquid crystal displays (LCD), a flexible display or a Lumalive® display panel.

According to yet another aspect, the pattern is rotation symmetric so that the object is invariant to rotation. Hereby, the orientation of the object is irrelevant, whereby the object cannot be oriented wrongly. Alternatively, the pattern comprises information sufficient to determine orientation of said object. If for instance the pattern is different for different part of the object, the orientation of the object may readily be determined. Thereby, it may e.g. be determined, that the person wearing the object is partly turned away from the camera device.

In another embodiment, the object is a protective mask arranged for covering at least part of the face of a person. Such a mask may be a mouth cap or face mask suitable for use by medical personnel such as doctors, nurses, etc. or it may be a complete mask suitable for use within the industrial field.

According to another aspect, the invention relates to a method for localizing the position of a source of a voice signal, the method comprising the steps of letting a person having speech organs arranged for being a source of a voice signal wear an object, wherein said object comprises a visually detectable pattern and wherein said pattern is arranged for being placed in a distance from the source of the voice signal; by means of a camera device recording at least one picture of said pattern or a part thereof; by means of localizing means determining the position of said pattern on the basis of said at least one picture; and adapting at least one microphone to the position of said source of a voice signal based on the position of said pattern and the distance between said pattern and the source of the voice signal; wherein said determination of the position of said source of the voice signal by said localizing means is based on image processing, where the image processing is performed on said at least one picture of said pattern or part thereof alone.

According to yet another aspect, the invention relates to a protective covering arranged for covering a least part of the face of a person, said protective covering comprising a pattern arranged to facilitate localization of said protective covering, where said localization comprises image analysis of a picture taken by a camera device of said pattern or part thereof. It is understood that the localization of the pattern of the covering entails localization of a person wearing said covering. The protective covering may e.g. be a face mask, mouth cap, a complete mask, a working coat, a doctor's white coat, an overall, etc.

Finally, the invention relates to a computer program enabling a processor to carry out the method of the invention. Thus, the invention relates to a computer program product being adapted to enable a computer system comprising at least one computer having data storage means associated therewith to control a system according to the invention. This aspect of the invention is particularly, but not exclusively, advantageous in that the present invention may be implemented by a computer program product enabling a computer system to perform the operations of the method of the invention. Thus, it is contemplated that some known system may be changed to operate according to the present invention by installing a computer program product on a computer system controlling the system. Such a computer program product may be provided on any kind of computer readable medium, e.g. magnetically or optically based medium, or through a computer based network, e.g. the Internet.

The different aspects of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
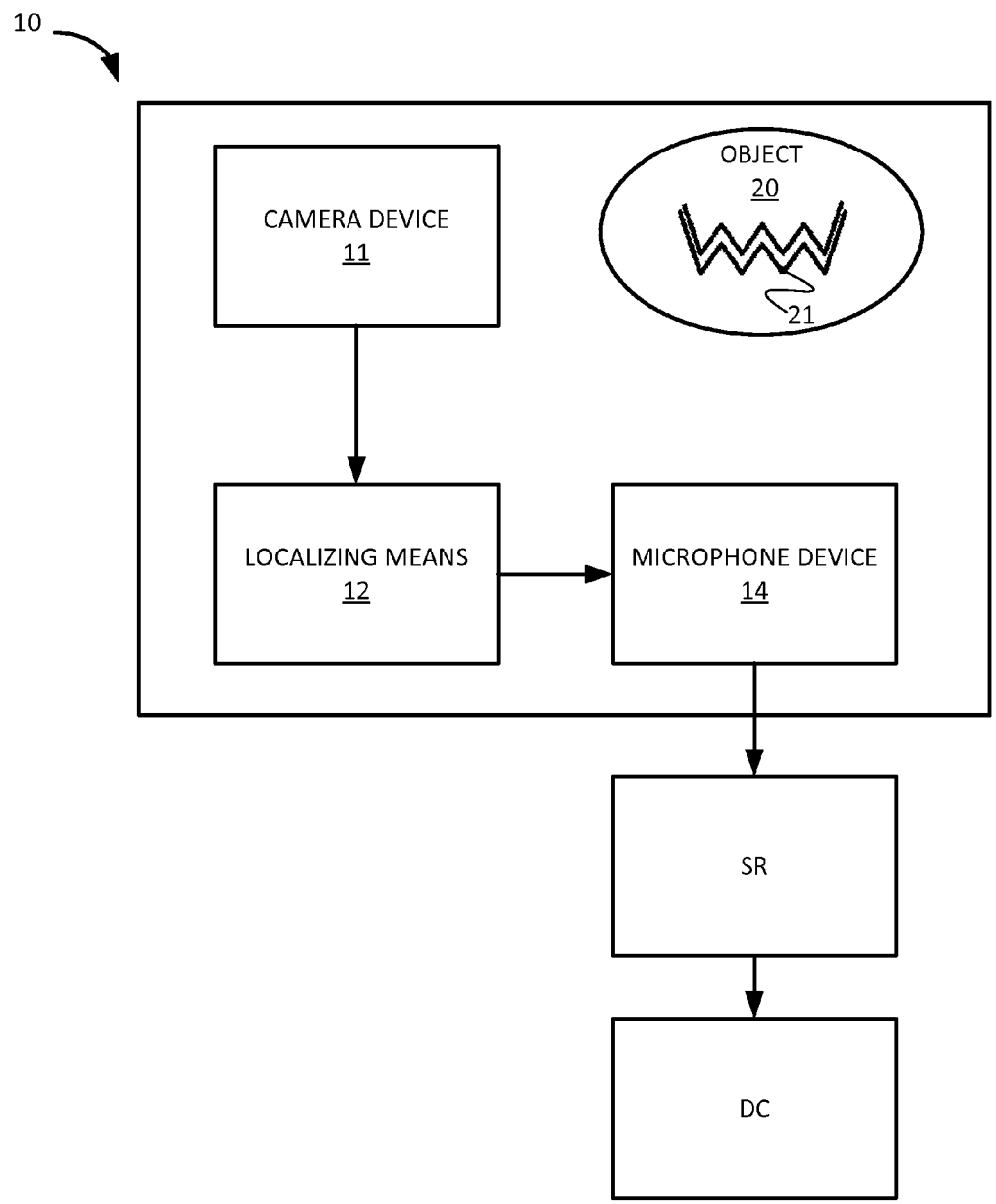
FIG. 1 is a structural block diagram of a system according to the invention.

FIG. 1 is a structural block diagram of a system 10 according to the invention. The system 10 comprises an object 20 arranged to be worn by a person having speech organs arranged to be the source of a voice signal. In the following, the position of the mouth of a person is regarded as being the position of the source of a voice signal from that person. The object 20 may be a protective covering, such as a mouth cap or face mask, arranged to be carried in front of the mouth of the person, or a complete mask arranged to cover the face. Alternatively, the object may be arranged to be placed on the clothes of a person, viz. it may be a badge or a sticker. It may also be any other suitable piece of clothing or device to be worn by the person, such as glasses, earphones, a tie, a working coat, a doctor's white coat, an overall, etc. The object 20 carries a visually detectable pattern 21.

The system moreover comprises a camera device 11 arranged to record pictures of the pattern 21 of the object 20. The camera device 11 is also arranged to output the recorded pictures to localizing means 12 arranged to determine the location or position of the pattern 21 on the basis of a picture thereof. The localizing means 12 is configured to determine the position of the pattern 21 based on image processing of the pattern 21. The pattern 21 may advantageously comprise sufficient information in itself to allow for such localization, so that the distance from the camera as well as the direction of the object relative to the camera device 11 may be determined from the picture of the pattern alone. Alternatively, the localizing means 12 may be provided with information on the pattern 21 prior to the localizing of the position thereof.

The system 10 moreover comprises a microphone device 14 comprising one or more microphones arranged to recording voice signals from one or more persons and arranged for adapting to the position of the source(s) of such voice signals based on the position of the pattern of the object and the distance between the pattern and the source(s) of the voice signals. The microphone device 14 may be a microphone array comprising two or more microphones, or it may comprise a single microphone only.

The system 10 moreover comprises control means arranged for directing the one or more microphones of the microphone device 14 on the basis of a signal from the localizing means 12 relating to the position of the pattern of the object. Such control means may be implemented as part of the localizing means 12, a part of the microphone device 14 or as a separate unit (not shown). The system 10 is arranged for outputting a signal from the microphone device 14. The signal from the microphone device 14 may be used in a device SR for using appropriate one or more signal processing techniques, such as filtering, noise suppression, and beam forming, in order to perform speech enhancement and/or speech recognition so as to identify speech commands. Such speech commands may be used for hands-free control of any appropriate device DV, such as a device in an operation room of a hospital, in an industrial environment, etc.

The components of the system 10 may be incorporated within a device DV arranged for voice control or hands-free control thereof or they may be separate from the device DV as shown in FIG. 1.

Figure 2:
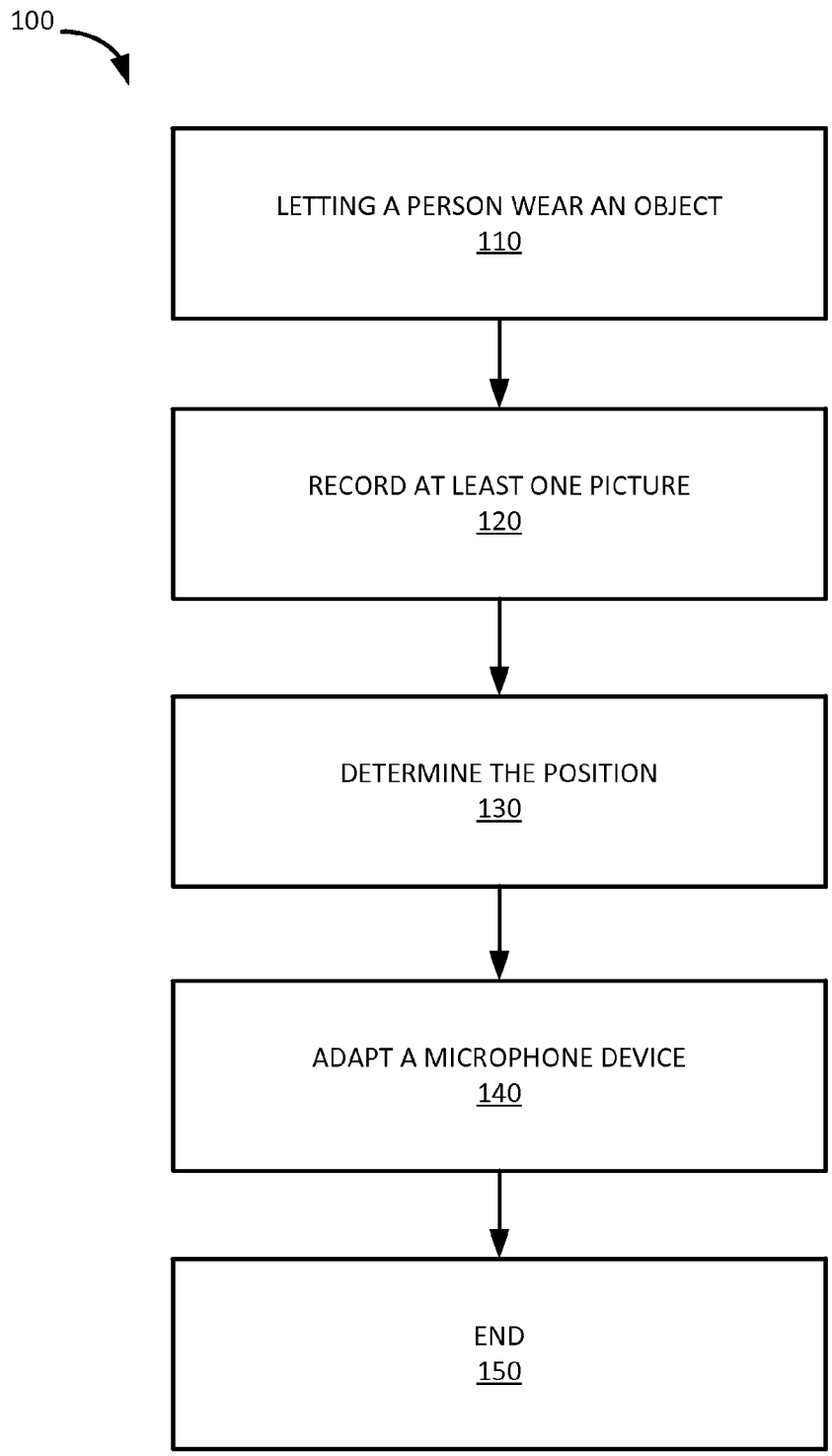
FIG. 2 is a flow-chart of a method according to the invention.

FIG. 2 is a flow-chart of a method 100 according to the invention. The method 100 starts in 110 by letting a person wear an object having a visually detectable pattern, where the pattern is arranged for being placed in a certain distance from the mouth of the person. The distance may be zero, if the pattern is on a mouth cap worn in front of the mouth of the person, or the distance may be greater than zero, if the object is worn on e.g. the clothes of the person, e.g. as a badge on the person's shirt.

In the subsequent step, step 120, a camera records at least one picture of said pattern or a part thereof. The camera may be arranged for recording a video sequence of pictures of the object with the pattern.

In the subsequent step 130, localizing means determines the position of said pattern on the basis of said at least one picture. The determination of the position of the pattern and thus of the source of the voice signal by said localizing means is based on image processing, where the image processing is performed on said at least one picture of said pattern or part thereof alone. If the object is arranged to be worn such that the pattern is at a substantial distance from the mouth of the person, the step of determining the position of the source of the voice signal preferably comprises compensating for the difference in position between said pattern of said object and the mouth of said person wearing the object.

In the subsequent step 140, the determined position of the voice signal based on the position of said pattern and the distance between said pattern and the mouth of the person wearing the object is used for adapting a microphone device to the position of the source of a voice signal. Such adaptation of the microphone device may comprise one or more of the following: performing signal processing techniques, such as beam forming; directing the one or more microphones of the microphone device so as to record voice signals from the person wearing the object in the best possible way. The method ends in step 150.

Between steps 140 and 150, the method may comprise the step of (not shown in FIG. 2) outputting the recorded voice signals from the microphone device to a device for subsequent signal processing techniques, such as filtering, noise suppression, beam forming, in order to perform speech enhancement and/or speech recognition so as to identify speech commands. The method may additionally (not shown in FIG. 2) comprise the step of using the speech commands for hands-free control of any appropriate device, such as a device in an operation room of a hospital, in an industrial environment, etc.

In summary, the invention relates to localizing the position of a person speaking by using pictures of a pattern on an object worn by the person. The object carries a complex pattern that is optimized for determining the orientation of the object, the distance from the object to a microphone device and/or to a camera. Moreover, the pattern may be arranged for identifying the person carrying the object. The determination of the position of the person carrying the object may be used to enhance speech recognition and/or to provide hands-free voice control of devices, e.g. in hospitals or in industrial settings.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A system for localizing a position of a source of a voice signal, comprising:
    an object arranged to be worn by a person having speech organs arranged for being a source of a voice signal, said object comprising a visually detectable pattern, said pattern arranged to be placed a distance from the source of the voice signal;
    a camera device arranged for recording at least one picture of at least part of said pattern;
    at least one processor to determine a position and an orientation of said pattern in relation to the camera device on the basis of said at least one picture;
    a compensator configured to compensate for a difference in position between said pattern of said object and the speech organs of said person wearing the object; and
    a microphone device arranged for adapting to the position of said source of a voice signal based on the position and the orientation of said pattern and the difference in position between said pattern of said object and the speech organs of said person wearing the object;

wherein said at least one processor is configured to determine the position of said source of the voice signal based on image processing, where the image processing is performed on said at least one picture of the at least part of said pattern.

2. The system according to claim 1, wherein said pattern is a complex pattern.

3. The system according to claim 1, wherein said pattern comprises a barcode and/or a plurality of colors.

4. The system according to claim 1, wherein said object comprises a display arranged for displaying said visually detectable pattern.

5. The system according to claim 1, wherein said pattern is rotation symmetric.

6. The system according to claim 1, wherein said pattern comprises information sufficient to determine the distance between said camera device and said object.

7. The system according to claim 1, wherein said object is a protective mask arranged for covering at least part of a face of said person.

8. A method for localizing a position of a source of a voice signal, the source of the voice signal being speech organs of a person wearing an object, the object comprising a visually detectable pattern placed a distance from the source of the voice signal, the method comprising:
   recording, using a camera device, at least one picture of at least part of said pattern;
   determining a position and an orientation of said pattern in relation to the camera device on the basis of said at least one picture;
   compensating for a difference in position between said pattern of said object and the speech organs of said person wearing the object; and
   adapting a microphone device to the position of said source of a voice signal based on the position and the orientation of said pattern and the difference in position between said pattern of said object and the speech organs of said person wearing the object;
   wherein said determination of the position of said source of the voice signal is based on image processing, where the image processing is performed on said at least one picture of the at least part of said pattern.

9. The method of claim 8, wherein said pattern comprises a barcode and/or a plurality of colors.

10. The method of claim 8, wherein said object is a protective mask arranged for covering at least part of a face of said person.

11. At least one non-transitory machine readable storage medium having instructions encoded thereon which, when executed by at least one processor cause the at least one processor to perform a method, the method comprising:
    recording at least one picture of at least part of said pattern;
    determining a position and an orientation of said pattern in relation to the camera device on the basis of said at least one picture;
    compensating for a difference in position between said pattern of said object and the speech organs of said person wearing the object; and
    adapting a microphone device to the position of said source of a voice signal based on the position and the orientation of said pattern and the difference in position distance between said pattern of said object and the source of the voice signal speech organs of said person wearing the object;
    wherein said determination of the position of said source of the voice signal is based on image processing, where the image processing is performed on said at least one picture of the at least part of said pattern.

12. The at least one non-transitory machine readable storage medium of claim 11, wherein said pattern is a complex pattern.

13. The at least one non-transitory machine readable storage medium of claim 11, wherein said pattern comprises a barcode and/or a plurality of colors.

14. The at least one non-transitory machine readable storage medium of claim 11, wherein said pattern comprises a display arranged for displaying said visually detectable pattern.

15. The at least one non-transitory machine readable storage medium of claim 11, wherein said pattern is rotation symmetric.

16. The at least one non-transitory machine readable storage medium of claim 11, wherein said pattern comprises a display arranged for displaying said visually detectable pattern.

17. The at least one non-transitory machine readable storage medium of claim 11, wherein said object is a protective mask arranged for covering at least part of a face of said person.

* * * * *